US011852256B2

US 11,852,256 B2
Dec. 26, 2023

(12) United States Patent
Michaeli et al.

(54) FLUSH-MOUNT VALVE

(71) Applicant: Ockerman Automation Consulting, Inc., Anacortes, WA (US)

(72) Inventors: Jennifer Michaeli, Smithfield, VA (US); Robert Walling, Pine Beach, NJ (US); Alden Nelson, Norfolk, VA (US)

(73) Assignee: Ockerman Automation Consulting, Inc., Ancortes, WA (US)

( * ) Notice: Subject to any disclaimer, the term of this patent is extended or adjusted under 35 U.S.C. 154(b) by 740 days.

(21) Appl. No.: 16/816,062

(22) Filed: Mar. 11, 2020

(65) Prior Publication Data
US 2021/0285560 A1 Sep. 16, 2021

(51) Int. Cl.
*F16K 24/00* (2006.01)
*F16K 1/04* (2006.01)
*B63B 13/00* (2006.01)
*F16K 31/18* (2006.01)

(52) U.S. Cl.
CPC .............. *F16K 24/00* (2013.01); *F16K 1/04* (2013.01); *B63B 13/00* (2013.01); *F16K 31/18* (2013.01)

(58) Field of Classification Search
CPC ... B63B 13/00; B63B 13/02; B63B 2013/005; F16K 1/04; F16K 24/00; F16K 24/02; F16K 24/04; F16K 24/06; F16K 31/50; F16K 31/18; Y10T 137/7905; Y10T 137/7838; Y10T 137/3124
USPC ....... 137/899.2, 43, 202, 331, 333; 114/197, 114/78; 251/215–227; 184/1.5
See application file for complete search history.

(56) References Cited

U.S. PATENT DOCUMENTS

| 271,060 A | * | 1/1883 | Graham | B63B 13/00 114/185 |
| 402,454 A | * | 4/1889 | Horton | B63B 13/02 251/215 |
| 713,834 A | * | 11/1902 | Bailey | B64D 11/02 137/391 |
| 1,125,979 A | * | 1/1915 | Dieter | F42B 19/00 137/208 |
| 1,182,194 A | * | 5/1916 | Mohr | B63B 19/00 114/178 |
| 1,187,522 A | * | 6/1916 | Grieshaber | B63G 8/40 114/212 |

(Continued)

FOREIGN PATENT DOCUMENTS

CN 203975138 U 12/2014
GB 595415 A 12/1947
(Continued)

OTHER PUBLICATIONS

International Search Report and Written Opinion for PCT Application No. PCT/US2021/021993, dated May 27, 2021.
(Continued)

*Primary Examiner* — Craig J Price
(74) *Attorney, Agent, or Firm* — Dorsey & Whitney LLP (57) ABSTRACT

A flush-mount valve and vent assemblies including the same are described. A flush-mount valve may include a valve mount and a valve barrier which are coupled to the underside of a structure forming part of a liquid-impermeable container. The flush-mount valve is arranged to control the flow of fluid(s) across a fluid passage in the structure and is mounted to the structure so as to remain fully within the interior of the container.

15 Claims, 7 Drawing Sheets

(56) References Cited

U.S. PATENT DOCUMENTS

| | | | | |
|---|---|---|---|---|
| 1,556,270 | A | 10/1925 | Welle | |
| 2,089,888 | A * | 8/1937 | Garrett | A63H 23/02 446/161 |
| 2,367,718 | A * | 1/1945 | Farrell | B63B 13/00 137/519 |
| 2,502,256 | A * | 3/1950 | Harding, Jr. | F16K 31/406 251/129.2 |
| 2,772,648 | A * | 12/1956 | De Persia | B63B 13/00 114/185 |
| 2,929,347 | A * | 3/1960 | Veltman | B63B 13/00 114/183 R |
| 2,949,879 | A * | 8/1960 | Kehn | B63B 13/00 114/271 |
| 3,262,413 | A * | 7/1966 | Douglas | B63B 32/10 440/46 |
| 3,502,361 | A | 3/1970 | Sieverin | |
| 4,146,207 | A * | 3/1979 | Rofe | F01M 11/0408 251/216 |
| 4,304,252 | A * | 12/1981 | Stanton | F16K 27/067 251/315.1 |
| 5,220,943 | A * | 6/1993 | Zink | F04B 43/10 137/565.17 |
| 6,237,639 | B1 * | 5/2001 | Jougla | B63B 13/00 114/345 |
| 6,615,760 | B1 * | 9/2003 | Wise | F16K 15/04 114/197 |
| 6,634,312 | B2 * | 10/2003 | Warner | B63B 13/02 114/183 R |
| 7,409,964 | B2 * | 8/2008 | Hoeptner, III | F16K 1/04 251/210 |
| 7,422,027 | B2 * | 9/2008 | Riviezzo | F16K 24/04 137/589 |
| 8,136,466 | B2 * | 3/2012 | Farber | F16K 31/22 114/183 R |
| 8,418,812 | B1 | 4/2013 | Rosen et al. | |
| 8,464,764 | B1 * | 6/2013 | Milsom | B60K 15/03519 137/202 |
| 8,807,162 | B2 * | 8/2014 | Monterrey | B63H 21/38 137/433 |
| 8,919,273 | B1 * | 12/2014 | Hoffman | B63B 13/00 114/312 |
| 9,453,583 | B1 * | 9/2016 | Boucher, II | F16K 24/042 |
| 11,279,458 | B2 * | 3/2022 | Michaeli | F24F 7/065 |
| 2005/0279269 | A1 | 12/2005 | Robinson et al. | |
| 2008/0099080 | A1 | 5/2008 | Saini et al. | |
| 2008/0223461 | A1 * | 9/2008 | Gerwin | B01D 36/006 137/588 |
| 2010/0263745 | A1 | 10/2010 | Symes | |
| 2011/0092113 | A1 | 4/2011 | Mataya | |
| 2020/0087137 | A1 * | 3/2020 | Ye | B67D 1/0802 |
| 2021/0284315 | A1 | 9/2021 | Michaeli et al. | |

FOREIGN PATENT DOCUMENTS

| | | |
|---|---|---|
| GB | 769155 A | 2/1957 |
| KR | 200341321 Y1 | 2/2004 |
| KR | 200389370 Y1 | 7/2005 |
| KR | 20150002641 A | 1/2015 |
| WO | 2019185968 A1 | 10/2019 |

OTHER PUBLICATIONS

U.S. Appl. No. 16/816,051 titled "Low Profile Vent Assembly for a Boat" filed Mar. 11, 2020.

* cited by examiner

FLUSH-MOUNT VALVE

TECHNICAL FIELD

The present disclosure generally relates to valves that, when mounted, are substantially flush with a surface to which they are mounted so as not to protrude from the surface irrespective of the state (e.g., open or closed) of the valve, and to valve assemblies that include a flush-mount valve, for example, for sealing a ballast or other type of tank of a vessel, such as a marine vessel.

BACKGROUND

A valve may be used to control the passage of a fluid through a wall or other barrier in various different applications and industries, including, for example, in aerospace, shipping, construction, mining, marine and other industries. For example, marine vessels that include ballast tanks typically include apertures, that may be sealed, for filling and purging water into and out of, and for venting air out of the tank. Continuing with the example of ballast tanks, which are typically located in the hold of a boat (e.g., below deck), existing mechanisms for sealing such tanks present various challenges and/or deficiencies, including difficulties of fully purging the ballast tank of air often resulting in the placement of a vent structure that protrudes above the deck of the boat. Accordingly, designers and manufacturers of valves for controlling the passage of a fluid through a wall or other barrier continue to seek improvements thereto.

SUMMARY

A valve assembly according to some embodiments of the present disclosure includes a panel having a first side and a second side opposite the first side, the panel defining a vent passage that provides the first side of the panel in fluid communication with the second side of the panel, a valve barrier movably coupled, via a mount, to the second side of the panel such that the valve barrier is movable between a first position in which the valve barrier substantially blocks the vent passage and a second position in which the valve barrier is spaced apart from the vent passage. The valve barrier remains below the first side of the panel irrespective of whether the valve barrier is in the first position or the second position. The valve assembly may also include a valve seal coupled to the second side of the panel, the valve seal including a ridge fixed to one of the second side of the panel or a first side of the valve barrier facing the panel, the ridge being positioned to surround the vent passage, and the ridge being arranged to contact a gasket coupled to the other one of the panel and the valve barrier when the valve barrier is in the first position. In some embodiments, the one or more transverse passages are adjacent to the second side of the vent panel. In some embodiments, the valve barrier is pivotable relative to the panel. In some embodiments, the valve barrier pivots about an axis normal to the panel to move between the first position and the second position. In other embodiments, the valve barrier pivots about an axis parallel to the panel to move between the first position and the second position. In some embodiments, the thickness of the panel near the vent passage is greater than a thickness of the panel at a location away from the vent passage. In some such embodiments, the first side of the valve barrier includes a depression configured to receive a portion of the panel therein when the valve barrier is in the first position. In some embodiments, the mount is fixed to the second side of the panel.

In some embodiments, the mount includes a tube fixed to the second side of the panel, wherein the tube defines a longitudinal passage along a length of the tube and one or more transverse passages through a thickness of the tube that fluidly connect an outside of the tube to the longitudinal passage, and the valve barrier being configured to translate along the length of the tube to move between the first position and the second position. In some embodiments, the tube and valve barrier may have a cylindrical geometry. For example, the tube may be a cylindrical tube, and wherein the valve barrier may include a cylindrical body received in the cylindrical tube and configured to move (i.e., axially) along the length of the tube. In some embodiments, the cylindrical body is threadedly coupled to the tube. In such embodiments, the cylindrical tube defines an axial passage, which may be axially aligned with the vent passage. The one or more transverse passage may be arranged at one or more radial locations along the perimeter of the tube, in some cases immediately adjacent to the underside of the vent panel, and may thus be referred to as radial passages. In some embodiments, the valve assembly further includes one or more seals at one or more locations along the length of the tube that seal the threaded interface between the cylindrical body and the tube. The valve barrier may be rotatably coupled to the tube.

A marine vessel according to some embodiments of the present disclosure includes a tank having a wall that separates an interior of the tank from an exterior of the vessel, the wall defined by a portion of a hull of the vessel, and a vent assembly coupled to the wall for fluidly coupling the interior of the tank to the exterior of the vessel. The vent assembly may include a vent panel having a first surface coplanar with an exterior surface of the vessel and a second surface opposite the first surface and which is positioned in the interior of the tank, the vent panel defining a vent passage, and a valve barrier positioned below the first surface and movable between a closed position in which the valve barrier blocks the vent passage and an open position in which the valve barrier is spaced apart from the vent passage, wherein the valve barrier is movably coupled to the vent panel via a valve mount that maintains the valve barrier below the first surface irrespective of whether the valve barrier is in the closed position or the open position. In some embodiments, the portion of the hull that defines the wall of the tank is a weather deck of the vessel. In some embodiments, the vent assembly may further include a valve seal coupled to an underside of the weather deck, wherein the valve seal comprises a ridge fixed to one of the underside of the weather deck or a first side of the valve barrier facing the weather deck, wherein the ridge is positioned to surround the vent passage, and wherein the ridge is arranged to contact a gasket coupled to the other one of the weather deck and the valve barrier when the valve barrier is in the closed position. In some embodiments, the mount includes a tube fixed to an underside of the weather deck of the vessel and the valve barrier is a body received within the tube and movably coupled to the tube to translate along a length of the tube for moving the valve barrier between the first and second positions. In some embodiments, the tube includes one or more transverse passages proximate the underside of the weather deck. In some embodiments, the tube is a cylindrical tube, and wherein the body is a cylindrical body rotatably coupled to the tube such that rotation of the cylindrical body about a longitudinal axis of the tube causes the cylindrical body to move along the longitudinal axis of the tube to move the valve barrier between the first and second positions. In some embodiments, the cylindrical body is threadedly coupled to the tube.

BRIEF DESCRIPTION OF THE DRAWINGS

The accompanying drawings and figures illustrate a number of exemplary non-limiting embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to flush-mount valves, which may be mounted flush with (e.g., at or below) the surface of a wall or other structure, across which the flow of a fluid is being controlled. The valve may be entirely positioned on one side of a wall or barrier so as to avoid protruding from the opposite side thereof. As such, the flow of a fluid may be controlled across a boundary without protruding beyond (e.g., above) the boundary. In some embodiments, the wall or barrier that defines the boundary may be part of a container (e.g., a tank or other sealable compartment) on a vessel, such as a land, air or marine vehicle. The valve may be used for sealing the container, thereby controlling the flow of a fluid into and out of the container. A valve according to the present disclosure may be used in maritime, mining, oilfield, shipping, aerospace, and other applications. For example, a flush-mount valve according to embodiments of the present disclosure may be used in marine applications such as for sealing a ballast of a variable displacement vessel, or another tank or compartment of the vessel that may have a wall that is part of the outer hull of the vessel, such as to provide a fluid tight seal to the tank or compartment without adversely impacting the hull profile of the vessel. In some embodiments, for example where it may be advantageous to reduce or eliminate structures that protrude from the outer surfaces (e.g., above the deck) of a watercraft, and thus existing valves or closure devices for sealing tanks that share a wall with an outer surface of the vessel may be inadequate. A flush-mount valve according to the present disclosure may be used to address shortcomings in existing vent closures for such tanks or compartments on a marine vessel, and/or in other applications including but not limited to mining, oil and gas, shipping, and aerospace applications. A flush-mount valve according to the present disclosure may provide a closure having a fluid-tight seal for sealing a container. The valve may include an articulating (e.g., translating or rotating) valve barrier, which is entirely positioned and remains, irrespective of the state of the valve, on one side of the wall of the container, for example in the interior of the container. The valve barrier may be implemented using any suitable structure such as a generally plate-like cover or panel, or a suitably shaped block, that moves (e.g., translates or rotates) to provide the valve between and open and closed state.

Figure 1:
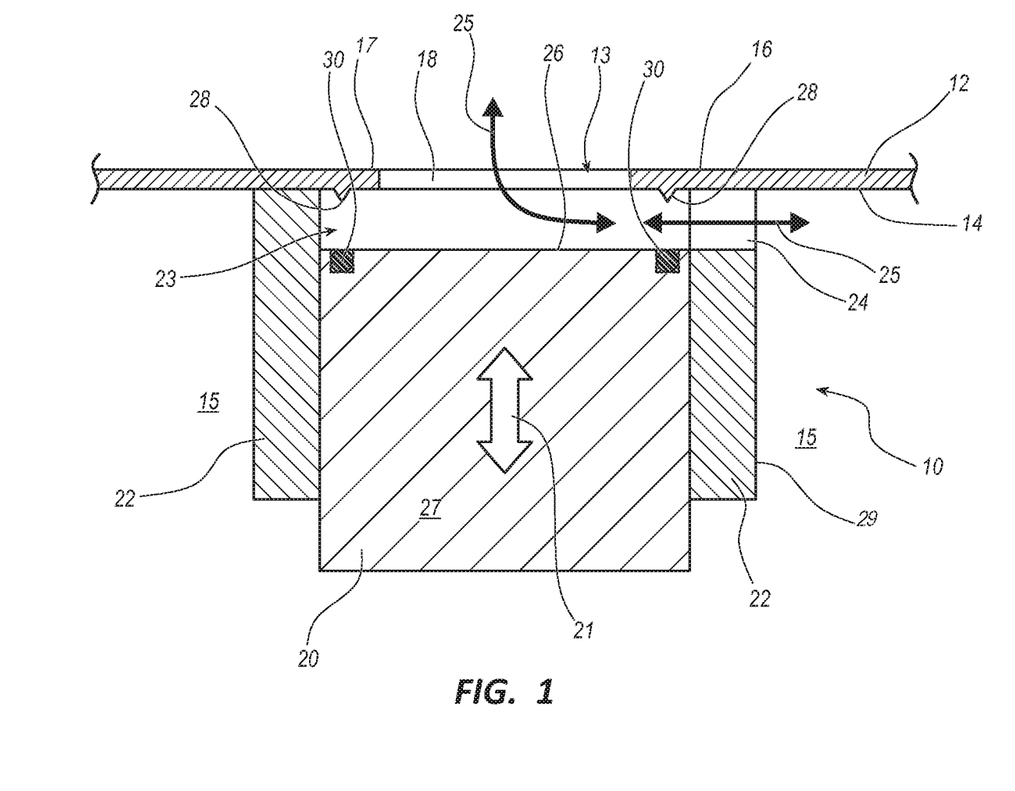
FIG. 1 shows a cross-sectional illustration of a flush-mount valve according to the present disclosure.

A flush-mount valve according to some embodiments herein is shown in the simplified illustration in FIG. 1. The valve 10 is positioned at one side of a barrier or structure 12. The barrier 12 may be provided by any substantially fluid-impermeable structure, such as the wall of a container having an interior 15. The term fluid-impermeable implies that the structure 12 is designed generally to minimize or prevent the passage of a liquid such as water from passing through the structure. As such, the barrier structure 12 may be implemented using any suitable solid, non-porous, structure that can substantially prevent the passage of a liquid therethrough. In embodiments, a structure 12, for example one made from multiple pieces of solid material that are joined together, may still be substantially water-tight and thus considered fluid-impermeable even if the structure 12 is not completely gas (e.g., air) tight. The first side 14 of the barrier 12 may thus be an interior or inner surface of the container, while a second side 16 of the barrier 12 (e.g., opposite the first side 14) may provide an exterior or outer surface. A boundary 13 is defined by the barrier 12 and more specifically by the outer surface 16, the passage of a fluid across which is controlled by the valve 10. The valve 10 is positioned such that it remains substantially below the outer surface 16 and thus below the boundary 13, at all times, irrespective of the state (e.g., opened or closed) of the valve 10. In other embodiments, the first side 14 may be on the outside while the second side 16 may be on the inside of a container or other type of structure, and the valve 10 may be mounted exteriorly thereto such that no portion of the valve 10, even when closed, protrudes beyond a boundary 13 defined by the second side 16. The substantially fluid-impermeable structure 12 may be any type of structure (e.g., a wall or panel of a container, the hull, deck, superstructure shell, or bulkhead of a marine vessel or a panel or wall of another type of vehicle, building structure, or other structures) with respect to which controlling the passage of fluid may be desired.

An opening 18 may be provided, which interrupts the barrier 12 (e.g., the wall of the container) to allow the selective passage of a fluid (e.g., water, air, or any other type of fluid) there through. In some embodiments, the opening 18 may be defined in the barrier 12 to provide a vent for venting a secondary fluid (e.g., a gas such as air) out of a container defined in part by the barrier 12 while a primary fluid (e.g., a liquid such as ballast liquid, in the case of a ballastable marine vessel) is moved into or out of the container. The opening 18 is a through-opening defined by and extending from one side (e.g., first side 14) to the other side (e.g., second side 16) of the barrier 12 thereby allowing a fluid (e.g., a liquid such as water or a gas such as air) to pass from one side (e.g., the first side 14) through the opening 18 to the other side (e.g., second side 16), or vice versa, when the valve 10 is provided in a state other that the closed state of the valve 10. For example, in the context of a closure for a tank, such as a ballast or fuel tank, air may flow from the interior of the tank to the exterior of the tank when the valve is in a state other than closed. When the valve 10 is closed, the opening 18 may be sealed (e.g., water-tight) such that a first type of fluid (e.g., a liquid such as ballast water, or fuel), also referred to as primary fluid, may be prevented from passing through the opening 18 in either direction (e.g., into the container or out of the container). In some embodiments, the seal at the opening 18 may optionally be air-tight thereby also substantially preventing the passage a second type of fluid (e.g., a gas such as air), also referred to as secondary fluid, across the opening 18. While a single opening 18 is shown in FIG. 1 for simplicity, it will be appreciated that the passage of a fluid across the barrier 12 may be accomplished with a plurality of openings. For example a plurality of smaller openings that collectively span of a substantially equivalent area of a larger single opening (e.g., opening 18) may instead be used to provide a through passage for the fluid across the structure or barrier 12.

The valve 10 in FIG. 1 includes an articulating valve barrier 20 and a valve mount 22, which movably supports the valve barrier 20. The valve mount 22 couples the articulating valve barrier to the structure 12. In some embodiments, as in the example in FIG. 1, the valve mount is positioned only on one side (e.g., the first side 14) and optionally fixed to that side (e.g., to the first side 14) of the structure 12. The valve mount 22 and the valve barrier 20 are configured so as not to protrude beyond the boundary 13 defined by the first side of the barrier 12. The valve barrier 20 articulates or moves (e.g., translates or rotates) relative to the valve mount 22 to provide the valve 10 between the open and closed states. The open state of the valve is a state or configuration of the valve in which the valve barrier 20 is in a position that allows the passage of a fluid through the opening 18. Conversely, the closed state of the valve is a state or configuration of the valve in which the valve barrier 20 is in a position in which the barrier 20 fluidly seals the opening 18 such as to prevent the passage of the primary fluid through the opening 18. In some embodiments, the valve 10 may have a single open position or state whereby the valve barrier may be translatable to one of two binary states or positions—an open position and a closed position. In other embodiments, the valve barrier may be translatable to any one of a plurality of different open positions, which may also control the rate of fluid flow through the valve.

The valve barrier 20 may be any suitable substantially fluid-impermeable member such as a plate or a block that is sufficiently large to span and thus block the opening 18 when positioned in the closed position. In some embodiments, the valve barrier 20 of a single valve 10 may be sized to span and thus block multiple openings 18, such as in examples in which the passage of fluid across the boundary 13 is provided for by a plurality of openings 18. The valve barrier 20 is operatively coupled (e.g., pivotally, slidably, threadedly, or otherwise coupled) to the valve mount 22 to enable the valve barrier 20 to move (e.g., rotate and/or translate) relative to the structure 12 that defines the opening 18. In some embodiments, the valve mount 22 may be integrally formed with the structure 12, e.g., with the first side 14 of the structure 12.

The valve mount 22 defines a longitudinal passage 23 that accommodates and is substantially filled by the valve barrier 20. In some embodiments, the valve barrier 20 may be smaller than the passage 23, e.g., to accommodate the movable mounting interface between the valve mount and the valve barrier 20, and may not substantially fill the passage 23 as long as the valve barrier 20 is sufficiently large to effectively block and/or seal the opening 18. The longitudinal passage 23 is configured to accommodate the movement of the valve barrier 20 toward and away from the opening 18. For example, the barrier mount 22 may be implemented using a tube of any suitable transverse geometry (e.g., a cylindrical, rectangular, or square tube) and the valve barrier 20 may be implemented using a plate or block, which may, in some embodiments, have a corresponding shape so as to substantially fill while still being able to move within the passage 23. The valve barrier 20 may be coupled to the mount 22 such that it translates and/or rotates within the passage 23.

In the example in FIG. 1, and as illustrated by arrow 21, the valve barrier 20 is configured to translate toward and away from the opening 18 for, respectively, sealing and unsealing the opening 18. When the valve barrier 20 is in an open position, as shown in FIG. 1, the valve barrier 20 is spaced apart from the opening 18 permitting the passage of a fluid across the boundary 13, through opening 18. The valve 10 may be closed, such as to seal the opening 18 by moving the valve barrier 20 towards and placing the valve barrier 20 adjacent to the opening 18. To enable the translation of the valve barrier 20 toward and away from the opening 18, the valve mount 22 may include any suitable structure that extends a sufficient length below the opening 18 to accommodate the distance of travel of the valve barrier 20. For example, the valve mount 22 may be implemented using a structure that substantially surrounds or encircles the opening 18 on the underside (e.g., side 14) of the structure 12. In some embodiment, the valve mount may have a corresponding or similar transverse cross sectional shape to the shape of the opening. For example, in embodiment in which the opening 18 is a circular opening, the valve mount 22 may be implemented using a cylindrical tube 29. In other embodiments, the transverse cross sectional geometry of the valve mount 22 and the opening 18 may be dissimilar (e.g., a substantially rectangular tube may provide a mount 22 for a valve positioned so as to surround a circular opening 18). The transverse dimension of the valve mount 22 (e.g., a diameter of the cylindrical tube 29) may be larger than the diameter of the opening 18 such that a ledge 17 that overhangs the passage 23 of the tube is defined when the valve 10 is operatively coupled to the structure 12.

The valve barrier 20, which may be a cylindrical block 27, and the mount 22, which may be a cylindrical tube 29, may be threadedly coupled to one another such that the valve barrier (e.g., cylindrical block 27) may be translated toward and away from the opening 18 by axially rotating (or threading) the valve barrier (e.g., cylindrical block 27) through the passage 23 of the valve mount 22 (e.g., the tube 29). Cooperating threads may be provided on at least a portion of the outer cylindrical surface of the block 27 and the inner cylindrical surface of the tube 29 to enable the block 27 to be moved axially (along direction 21) through the threaded engagement and axial rotation of the block 27 within the tube 29. In some embodiments, the valve barrier 20 (e.g., block 27) may be translated toward or away from the opening 18 by an actuator that spins the valve barrier 20 (e.g., block 27) relative to the mount 22 (e.g., tube 29) without the assistance of cooperating threads. For example, the block 27 may be coupled to the free end of a rotary actuator such as a stepper motor, responsive to the operation of which the block 27 may spin substantially freely within the tube 29 when being translated toward or away from the opening 18. Thus, in some embodiments, the closing of the valve 10 by moving the valve barrier 20 to the closed position may load the seal (e.g., the gasket 30) primarily or only in compression, thereby reducing or eliminating loading in shear on the seal (e.g., the gasket 30), which may reduce the wear and tear on the sealing member. The actuator (e.g., stepper motor) may be axially aligned with the block 27 (e.g., positioned downstream of the block 27) or it may be located elsewhere (e.g., with its rotating shaft angled to the axial direction of the block) and the rotation of the shaft otherwise operatively coupled to the block 27. In other embodiments, the valve barrier 20 and mount 22 may be differently coupled, such as via any suitable sliding interface (e.g., rollers, tracks or rails and cooperating surface(s), grooves or channels) whereby the valve barrier 20 may slide along the length of the mount, the length here being defined in a direction away from the underside (e.g., side 14) of the structure. In yet other examples, the valve barrier 20 may be coupled to the valve mount 22 to pivot about an axis transverse to the length of the mount 22. Different arrangements for coupling and/or translating the valve barrier 20 relative to the structure 12 may be used in other examples.

The barrier mount 22 includes one or more transverse passages 24 that extend through a wall of the barrier mount 22. The one or more transverse passages 24 provide a fluid communication path, as indicated by arrows 25, from one side (e.g., the first side 14) to the other side (e.g., second side 16) of the structure 12, for example to allow fluid to pass into and out of the interior 15 of the container. In some embodiments, the valve 10 may be configured to minimize or substantially eliminate the amount of secondary fluid (e.g., air) that may be trapped on one side of the structure 12 (e.g., on the inside of the container). For example, the one or more transverse passages 24 may be located proximate the first side 14 of the structure 12 and thus the opening 18, in some cases immediately adjacent to the first side 14, to increase or maximize the amount of the secondary fluid (e.g., a gas such as air) that can be purged out of the interior 15 such as when being replaced by of the primary fluid (e.g., a liquid fluid such as water or fuel), prior to sealing the valve 10. In embodiments in which the mount 20 is configured as a cylindrical tube 29, the transverse passage(s) 24 may be provided by one or more radially distributed through-passages in the walls of the tube 29. In some embodiments multiple transvers passages 24 may be provided at different radial locations around the perimeter of the tube 29. In some embodiments, the one or more transverse passages 24 may be located such that they are covered or blocked by the valve barrier 20, when the valve barrier 20 is in the closed position. For example, the valve barrier 20 may have a length which is greater than the distance between the first side 14 and the one or more transverse passages 24 such that when the valve barrier 20 is moved toward the opening 18 to close the valve 10, the fluid-impermeable body of the valve barrier 20 covers the one or more transverse passages 24 substantially preventing the primary fluid from passing through the one or more transverse passages 24.

The valve 10 may be positioned relative to the structure 12 (e.g., the exterior wall of a container) such that it protrudes or extends only on one side (e.g., the first side 14), without any portion of the valve 10 extending or protruding from the other side (e.g., the second side 16), of the structure 12. Therefore, the second side 16, and thus the boundary 13 defined by the second side, may be substantially unaffected and uninterrupted by the presence or operation (i.e., opening and closing) of the valve 10. It may therefore be difficult, in some cases, for an observer to perceive the presence of the valve 10, which may be advantageous (e.g., for aesthetics, observability characteristics, or other) in some applications. In some use cases, it may be advantageous to substantially fill or plug the opening 18 (e.g., to reduce the observability of any interruptions in the outer surface of the structure 12). Thus, in some embodiments, a portion of the valve 10, such as a portion of the opening-facing side 26 of the valve barrier 20, may extend into the opening 18 and/or substantially fill the opening 18 when the valve is in the closed position. Even when extending into the opening 18, the opening-facing side 26 of the valve barrier 20 may be configured to remain at or below the boundary 13. While for simplicity a substantially flat structure 12 is shown, it will be understood that the structure 12 may have a curved outer surface on the second side 16 and thus, in embodiments in which the opening-facing side 26 of the valve barrier 20 fill the opening, the opening-facing side 26 may have a corresponding curved portion that follows the profile or contour of the outer surface of the structure 12.

The valve 10 may include a sealing assembly, for example a ridge-and-gasket sealing assembly, which provides a fluid-tight seal when the valve 10 is in the closed position. The term fluid-tight seal in the context herein, when describe the sealing of the valve, refers to substantially sealing the valve against the egress or ingress of a liquid (e.g., a liquid-tight seal). In some embodiments, the seal may optionally, but need not necessarily, be gas-tight such as to substantially prevent also the passage of a gas such as air. The sealing assembly may include a gasket 30 and a ridge 28, which is operatively arranged to be pressed against the gasket 30 to provide the fluid-tight seal. The gasket 30 may be provided by one or more resilient members (e.g., one or more O-rings). In some embodiments, the gasket 30 may not be resilient. The gasket 30 (e.g., one or more O-rings) may extend, in some cases continuously, along a perimeter of the opening facing side 26. The gasket 30 may be coupled to the valve barrier 20 such that it moves with the valve barrier 20 and the ridge 28 may be fixed to (e.g., rigidly coupled to or integrally formed with) the mounting side (e.g., first side 14) of the structure 12. In some embodiments, the location of the gasket 30 and the ridge 28 may be reversed. That is, the ridge may be carried on the movable part (i.e., the valve barrier 20) while the gasket is coupled to the mounting side (e.g., first side 14) of the structure 12. In some embodiments multiple ridges and gaskets may be used. In some such embodiments, the valve barrier 20 may carry at least one ridge and at least one gasket, which are arranged to engage a corresponding gasket and ridge on the underside (e.g., first side 14) of the structure 12. The ridge 28 may be provided by any suitably shaped protrusion, for example a pointed, blunt, rounded, or differently shaped protrusion or series of protrusions that substantially continuously surround(s) the opening 18 and extend(s) towards the gasket 30 to contact and/or press against the gasket 30 when the valve barrier 20 is in the closed position.

As noted, a flush-mount valve, such as valve 10, may be used in a variety of applications, including but not limited to marine applications. For example, the flush-mount valve 10 may be used to seal a tank (e.g., a ballast tank) of a marine vessel, which may be a variable displacement vessel capable of selectively taking in or expelling ballast to selectively vary the displacement of the vessel. As such the vessel may be able to selectively transition between a low freeboard mode, by taking on ballast to increase the weight and therefore displacement of the boat, and a high freeboard mode, by expelling a ballast fluid (e.g., water) and/or consuming a ballast fluid (e.g., fuel) to decrease the weight and therefore displacement of the vessel. A ballast tank may need to be vented to allow air to be purged when being replaced by ballast and/or to allow air to enter the tank to replace the ballast that is being expelled from the tank. Air vents for ballast tanks are often positioned near the top of the tank to avoid down flooding and/or provide more complete venting of the tank. Conventionally, ballast tanks are vented with so called "goose neck" vents which typically include a tubular structure that extends some distance above the weather deck of the vessel. The tubular structure is often curved downward at its terminal end so that its opening is spaced above and faces the deck surface. In this way, air may exit the ballast tank through the tube to the surrounding atmosphere without the terminal tube opening being exposed to rain, splashing, or other ingress of water through the top of the tube into the ballast tank. In some cases, a ball valve or similar automatic stopper may be placed within the tubular structure of the gooseneck, to prevent the ingress of water if the gooseneck opening is submerged. However, as described, a goose neck type vent protrudes above the deck surface of the vessel and may be unsuitable for watercraft with certain desired performance capabilities. In some cases, it may be advantageous to avoid or limit the structures that protrude beyond the vessel's hull or other surfaces (e.g., the vessel's weather deck). As such, venting a ballast tank using existing technologies (e.g., a goose neck vent) may be unsuitable in some use cases, and a flush-mount valve according to the present disclosure may address one or more shortcomings of existing solutions.

Figure 2:
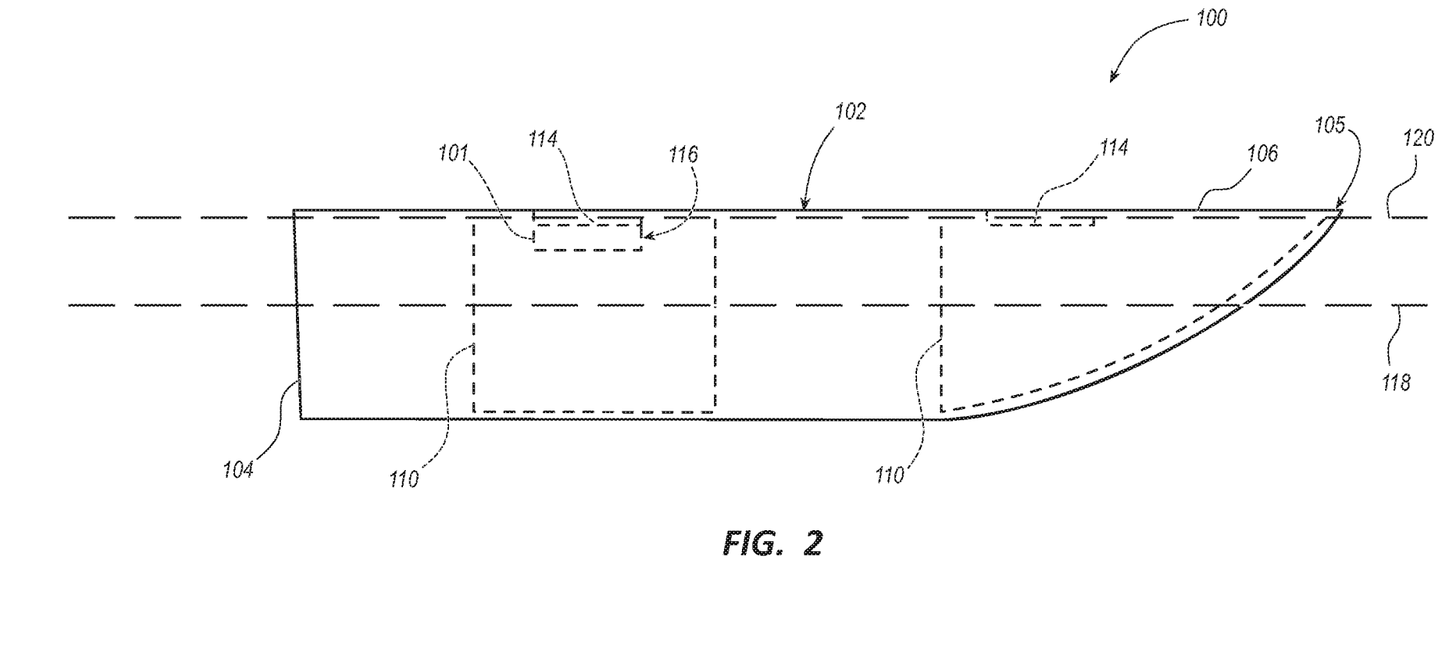
FIG. 2 is a profile view of a marine vessel according to an embodiment of the present disclosure.

FIG. 2 is a side view of a marine vessel 100 which may be equipped with a flush-mount valve 101 according to any embodiments of the present disclosure. For example, the valve 10 may be used to implement the flush-mount valve 101 of the vessel in FIG. 2. The vessel 100 has a hull 102 that extends longitudinally between the bow 105 and the stern 104 of the vessel. The vessel 100 may have a weather deck 106 which may, at least partially, enclose the cavity defined by the hull 102. In some embodiments, the vessel may optionally include superstructure, e.g., a deckhouse or bridge, that may be extend above the deck 106. The vessel 100 may be a surface vessel, a semi-submersible vessel, or a fully submersible vessel. The vessel 100 may include one or more sealable compartments, such as a tank 110 (e.g., a fuel and/or ballast tank), within the hull 102. Any of the sealable compartments (e.g., each of the one or more tanks 110) may be associated with a respective vent assembly 116 that includes a flush-mount valve 101 according to the present disclosure. While described here the context of sealing a tank, the flush-mount valve 101 may be associated with and used to seal the vent of any other type of compartment of a marine vessel (e.g., a dry compartment such as a crew cabin or control area, an engine compartment, an external tank that is positioned outside of the hull cavity), or any other container or compartment of a different type of vessel (e.g., an aircraft, a spacecraft, a land vehicle, etc.). In the marine vessel example in FIG. 2, any one of the tanks 110 may, in some embodiments, be designed to contain at least two different types of fluids that may function as ballast (e.g., fuel and water). One of the two fluids may be held in a flexible bladder within the tank 110 and the tank may thus function as both a primary (e.g., ballast) and a secondary (e.g., fuel) tank.

The vessel 100 may be a variable displacement vessel and the tank 110 may be a ballast tank associated with a vent 114 that fluidly couples the interior of the tank 110 with the exterior surrounding the hull 102 of the vessel 100. The vent 114 may be positioned near the top of the tanks to enable the venting or in-take of air as the tank is filled or purged, respectively. A flush-mount valve 101 may be operatively associated with the vent 114 to provide a vent assembly 116 that is substantially at or below the hull surface in which the vent 114 is formed, in this case the deck surface. The ballast tank 110 is associated with any suitable arrangement of conduit(s), ballast fluid intake(s) and/or pump(s) operatively arranged to enable the ballast system of the vessel to selectively fill the tank 110 with a fluid (e.g., water or another liquid), which may be taken in from the exterior of the hull 102 (e.g., from the water on which the vessel 100 is floating). When a tank 110 is being filled, the vent assembly 116 (e.g., the valve 101) may be provided in an open configuration to allow a secondary fluid (e.g., air or another type of gas) to vent out of the tank 110. Similarly, when the tank 110 is purged the vent assembly 116 (e.g., valve 101) may be opened to allow a secondary fluid (e.g., air or another type of gas) to enter the tank 110 to replace the purged volume of fluid. When it is desired to seal the tank (e.g., after a tank is at least partially filled or purged) such as when it is desirable to prevent the passage of fluid of any type (e.g., gas or liquid) through the vent 114, the valve 101 may be closed to block the vent opening. For example, it may be desired to seal the vent 114 of the tank 110 when the vessel is operating in a low freeboard mode in which the waterline 120 may be high and thus located nearer to the opening of the vent 114 than if the vessel was operating in a high freeboard mode (i.e. relatively less displacement than the high freeboard mode) in which the waterline 118 is further away from the vent opening.

The vent 114 may include one or more openings or passages in the wall of the tank 110 that connect the interior of the tank to the exterior (e.g., surrounding area of the vessel, such as above the deck 106, such as in cases where the vent is placed in a deck surface). The vent opening(s) or passage(s) may be formed in a vent plate which is joined to the deck surface such that it is substantially coplanar with the deck surface. While described as coplanar, it will be understood that in instances where the surrounding surface (e.g., the deck surface) is not flat, the surface(s) of the vent plate lie in a plane or curved surface that smoothly (without substantial disruptions or discontinuities) continues the profile or contour of the surrounding surface. As such, the inclusion of the vent plate and vent assembly does not cause any perceivable protrusions or steps along the surface of the surrounding structure (e.g., the hull or deck surface). Regardless of the outer surface with which the vent assembly is associated (e.g., a hull surface or a deck surface), the flush-mount vent assembly may reduce or eliminate any disruptions or discontinuities in the outer profile of the vessel 100, which may be relatively streamlined for various reasons. The outer surfaces of the vent 114 (e.g., the outer surface of a vent plate in cases in which a separate vent plate is used) may be substantially coplanar with, and in some cases flat like, the surrounding surfaces to which the vent assembly is mounted. In some embodiments, the outer surfaces of the vessel 100 that bear the vent 114 may be curved or have another shape, in which case the vent 114 may match and continue the shape of the surrounding surface. For example, on a dome-shaped surface, the vents 114, 116 may have a curvature the continuously follows the shape of the dome.

Figure 3:
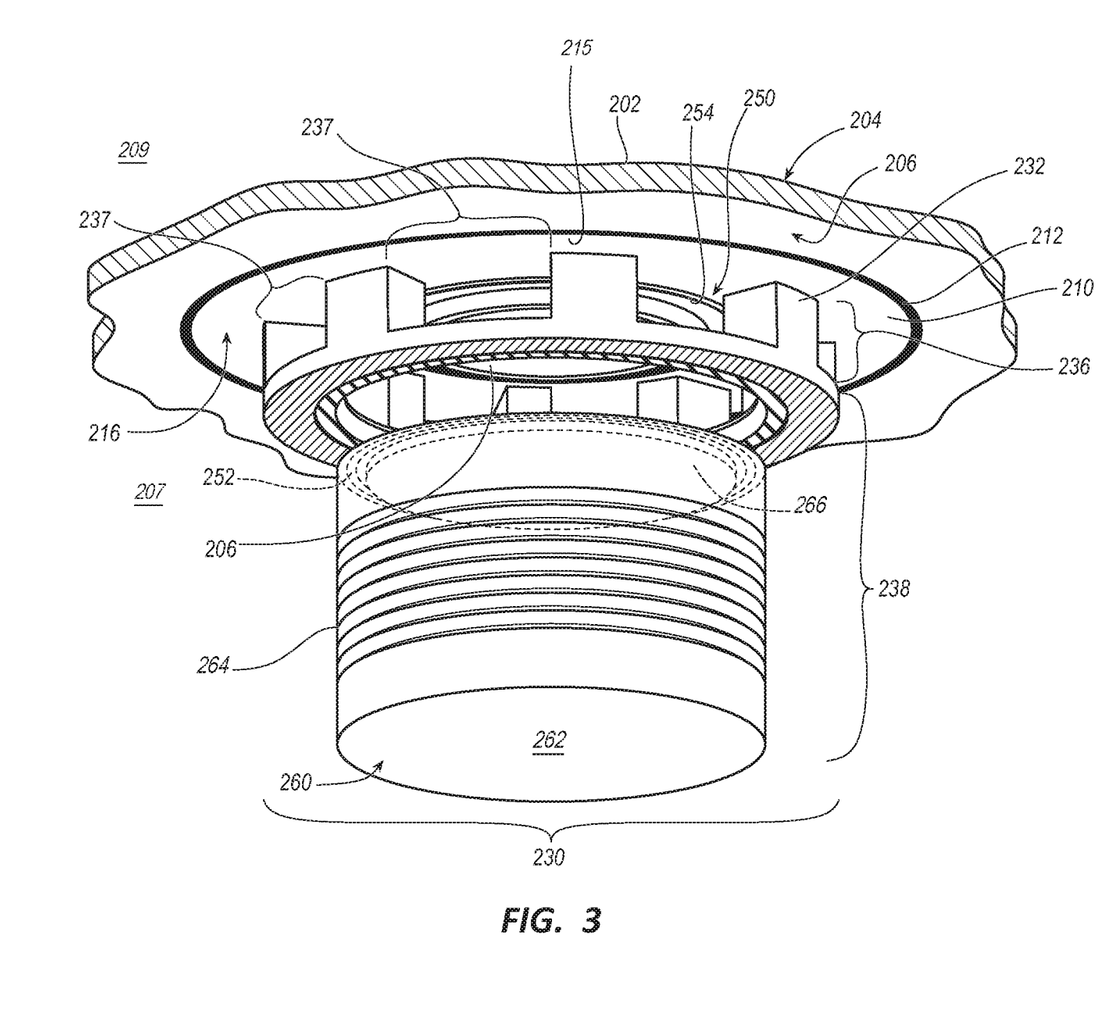
FIG. 3 is an isometric view of a vent assembly that may be used for venting and sealing a compartment of the marine vessel in FIG. 2.
Figure 4:
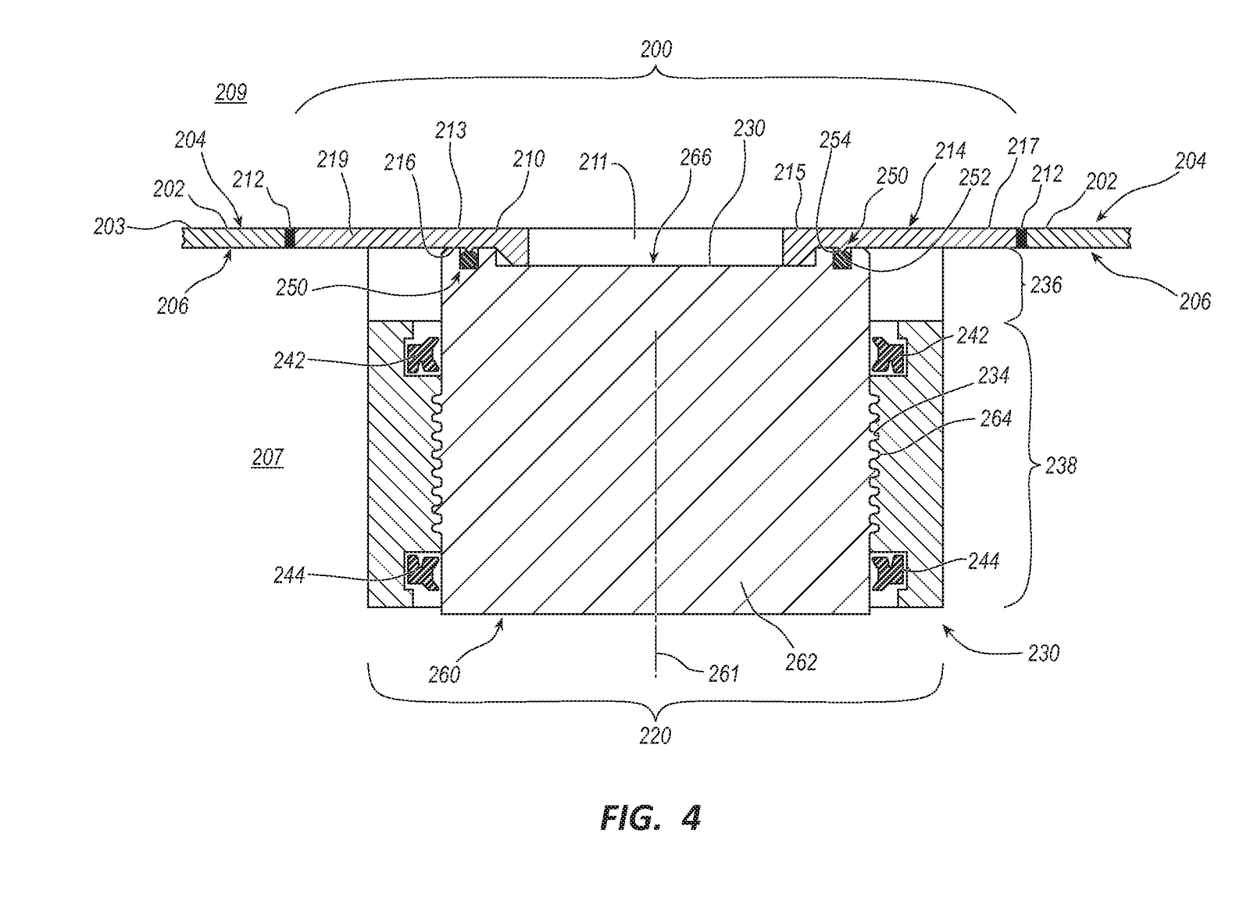
FIG. 4 is a cross-sectional view of the vent assembly in FIG. 3 with the flush-mount valve shown in a closed state.
Figure 5:
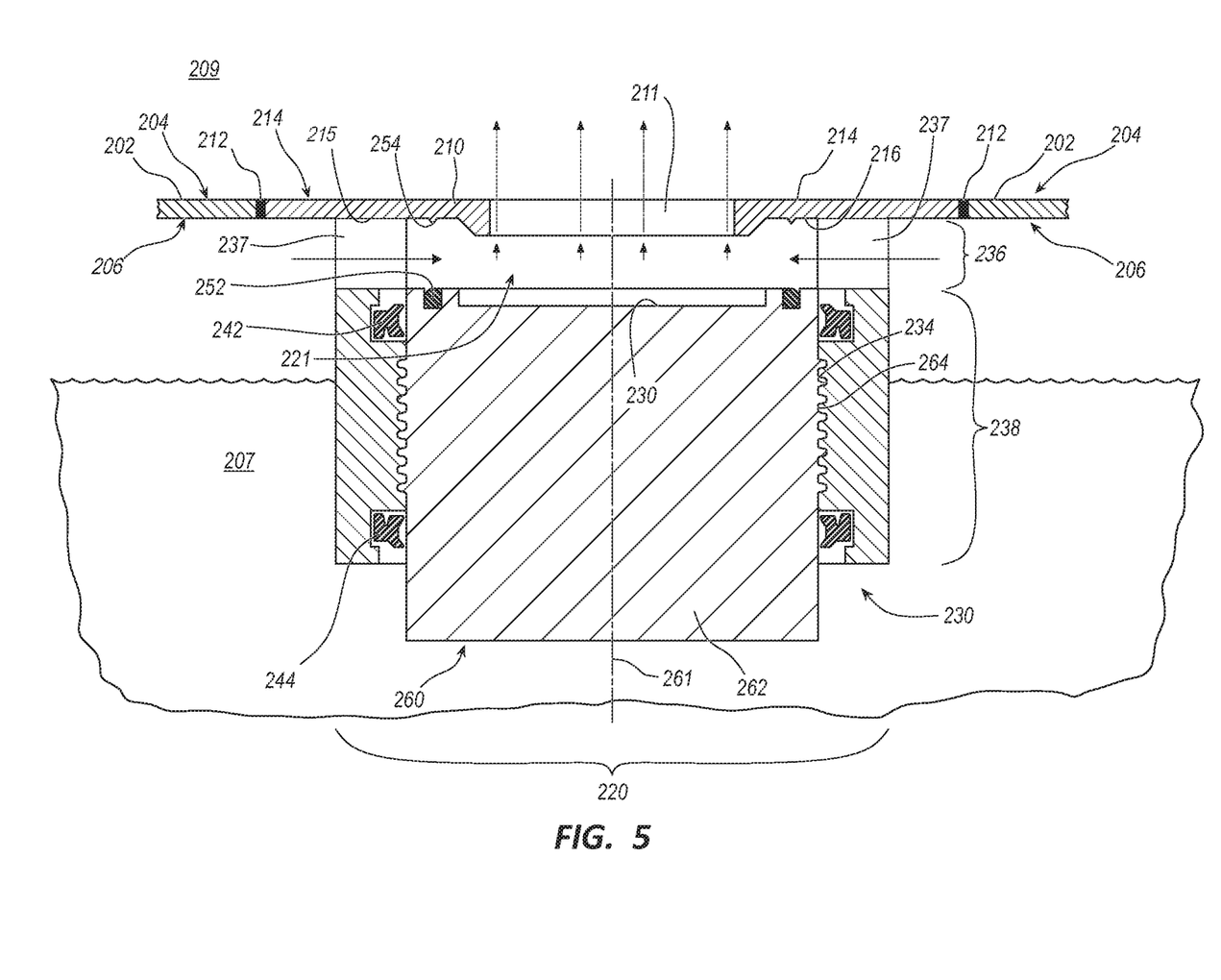
FIG. 5 is a cross-sectional view of the vent assembly in FIG. 3 with the flush-mount valve shown in an open state.

FIGS. 3-5 show views of a vent assembly 200 for a boat, such as vessel 100 in FIG. 2, according to some examples of the present disclosure. FIG. 3 shows an isometric view from the underside of the vent assembly 200 looking up and with a portion of the valve cutaway to show elements thereof. FIGS. 4 and 5 show cross-sectional views of the valve assembly taken at the same cross-sectional line but showing the valve in two different states including the closed state and an open state, respectively. The vent assembly 200 may be used to implement the vent assembly 116 on the vessel 100 in FIG. 2, such as to sealingly vent a compartment (e.g., a tank 110, a crew cabin, or other) of the vessel 100.

The vent assembly 200 includes a vent panel 210 and a flush-mount valve 220, which is mounted so as to remain entirely on one side of the vent panel 210. The vent panel 210 may be rigidly coupled (e.g., by being integrally formed with or fixedly attached at joints 212 by welding, fastening, or using any other suitable mounting technique) to an exterior structure 202 of a marine vessel 100, such as the weather deck 106 or another portion of the hull 102. The exterior structure 202 may form part of an external wall of a compartment of the vessel 100, such that the structure 202 separates the interior 207 of the compartment from the exterior 209 surrounding the vessel 100. The vent panel 210 may be coupled to the structure 202 such that a first surface 213 of the vent panel 210 is substantially flush or co-planar with a first surface 203 of the exterior structure 202 (e.g., deck 106). The exterior structure 202 provides a fluid-impermeable barrier that prevents the passage of a fluid (e.g., a liquid or a gas) through the barrier, except for the selective passage of fluid through the vent assembly 200. To that end, the vent panel 210 defines a vent passage 211, which provides the first sides 204 and 214 of the structure 202 (e.g., deck 106) and vent panel 210, respectively, and consequently the exterior 209 of the vessel 100 in fluid communication with the second sides 206 and 216 of the structure 202 and the vent panel 210, respectively, and consequently with the interior 207 of the compartment (e.g., tank 110). The first sides 204 and 214 may thus be referred to as top, upper or outer sides, and the second sides 206 and 216 may be referred to as the bottom, inner, or under-sides of the respective component or structure. When assembled, the undersides 206 and 216 of the structure 202 and the vent panel 210, respectively, may be substantially flush or co-planar with one another at the location near the joint(s) 212.

The vent passage 211 is a through passage which extends from the first side 214 to the second side 216 of the vent panel 210. The vent passage 211 may be implemented as a single or multiple through holes or openings through the vent panel 210. In some embodiments, the thickness of the vent panel 210 may vary. For example, a first (e.g., central) portion 215 of the vent panel 210 near the vent passage 211 may be thicker than a second (e.g., peripheral) portion 217 of the vent panel 210 near the joint(s) 212), which may increase the rigidity or stiffness of the vent panel 210 at a location (e.g., near the vent passage 211) which may otherwise have reduced stiffness due to the inclusion of a through hole therein. In other embodiments, the thickness of the vent panel 210 may vary differently, for example the central portion may be thinner than the peripheral portion, or it may be substantially constant along the full panel 210. The vent panel 210 may be configured such that, when assembled to the structure 202, the variability in thickness is located on the underside 206 of the structure 202 so as to avoid any protrusions or discontinuities on the first (e.g., outer) side 204 of the structure 202. In some embodiments, a screen (not shown) may be provided across (e.g., inside) the vent passage 211. The screen may be mounted such that its outer surface is substantially flush or co-planer with the first (or outer) surface 213 of the vent panel 210. The screen may be position within the vent passage 211, such as to be substantially co-extensive with, thereby filling, the vent passage 211. The screen may define a larger number (e.g., 10, 20, 30, or hundreds) of smaller through openings for fluidly connecting the first and second sides 204 and 206 of the structure 202, while reducing or eliminating any protrusions or disruptions across the outer surface 203 of the structure 202 whereby a substantially streamlined or smooth (e.g., flat) surface can be maintained despite the incorporation of a vent assembly 200 within the structure 202. In some embodiments which do not include a screen, the valve barrier 260 may be configured to substantially plug the vent passage 211.

The valve 220 may be coupled to the vent panel 210 to remain substantially on one side of the vent panel 210 irrespective of the state (e.g., closed or open) of the valve 220. The valve 220 includes a valve mount 230, shown here as a cylindrical tube 232, and a valve barrier 260, shown here as a cylindrical body 262. The body 262 may be configured to substantially fill or plug the tube 232. The cylindrical body 262 may be operatively coupled to move along the length of the cylindrical tube 232. For example, the cylindrical body 262 may be threadedly coupled via cooperating threads 234 and 264 on the tube 232 and body 262, respectively, such that the cylindrical body 262 can be rotated about its axis 261 to translate axially, along the length of the tube 232. In this example, the valve barrier (e.g., body 262) is rotated in order to be translated between the closed state and an open state of the valve 220 shown in FIGS. 4 and 5, respectively. In other embodiments, the valve barrier (e.g., body 262) may be differently translated up and down, such as by simply sliding the body 262 within the passage defined by the cylindrical tube 232. In other examples, the valve barrier 260 (e.g., body 262) and valve mount 230 (e.g., tube 232) may not be cylindrical, and the valve barrier 260 (e.g., body 262) may be configured to translate axially without rotation relative to the valve mount 230 (e.g., tube 232), for example via any suitable slidable interface. In some such embodiments, the tube 232 and body 262 may have non-cylindrical cross-sectional geometries, and may instead be rectangular, triangular, oval, or other suitable shape. The valve 220, and more specifically the valve mount 230 (e.g., tube 232) may be fixedly coupled to (e.g., welded or otherwise joined to, or integrally formed with) the vent panel 210 so as to extend away from the second (e.g., under) side 216 of the vent panel 210. In some embodiments, the valve mount 230 (e.g., tube 232) may be integrally formed with the vent panel 210, for example by being machined out of a single block of material, cast as a single part, built up as a single monolithic component through additive manufacturing, or otherwise formed using any other suitable technique. Whether integrally formed or separately formed and operatively jointed to one another, in some embodiments, a portion of the vent panel 210 may extend radially outward from the periphery of the tube 232 to form a flange 219 such as for joining the vent assembly 200 to the surrounding structure 202.

The tube 232 may include a first portion 236 near the vent passage 211, and a second portion 238 connected to the first portion 236. The first portion 236 defines at least one transverse (e.g., radial) passages 237 through the thickness of the tube 232. In some embodiments, the first portion 236 includes a plurality of transverse (e.g., radial) passages 237 provided by a plurality of circumferentially spaced apart openings through the thickness of the tube 232. Any suitable number of transverse (e.g., radial) passages 237 may be used. In the case of multiple transverse (e.g., radial) passages 237, the passages 237 may be equally spaced around the circumference of the tube 232, or they may be irregularly spaced. The configuration (e.g., number, shape, size, etc.) of the one or more transverse (e.g., radial) passages 237 may be selected based on a desired rate of fluid flow through the valve 220, e.g., into or out of the container (e.g., tank 110). The transverse (e.g., radial) passages 237 may have any suitable geometry, for example it may have a circular, rectangular, or other regular or irregular cross-sectional shape. In some embodiments, the one or more transverse (e.g., radial) passages 237 are arranged in the first portion 236 such that they are adjacent to the underside 216 of the vent panel 210. For example, one side of the transverse (e.g., radial) passage(s) 237 may be defined by the surface 215 of the vent panel 210 located on the underside 216 of the vent panel 210 such that the transverse (e.g., radial) passage(s) 237 are immediately adjacent to the underside 216 of the vent panel 210. The one or more transverse (e.g., radial) passages 237 provide fluid communication between the passage 221 defined by the tube 232 and the exterior surrounding the tube 232, which is the interior 207 of the compartment (e.g., tank 110) when the valve 220 is operatively installed therein. In embodiments in which the first portion 236 includes a plurality of transverse (e.g., radial) passages 237, the transverse passages 237 may be circumferentially spaced apart and thus at different, in some cases in diametrically opposite, radial locations around the perimeter of the first portion 236. Having a plurality of transverse passages 237 that are spaced around the periphery of the mount 230, near the vent passage 211, may facilitate a more complete purging of the compartment (e.g., during venting) by allowing as much of the fluid (e.g., air in the case of a fuel or ballast tank) to escape from the compartment through the proximately located vent passage 211 as the compartment is filled with another fluid (e.g., fuel and/or ballast). This may reduce the size of or substantially eliminate air pockets that may otherwise remain inside the compartment (e.g., tank) thereby maximizing the amount of usable volume for containment of a desired fluid.

The second portion 238 of the valve mount 230 (e.g., tube 232) may include a coupling interface (e.g., threads 234) for movably coupling the valve barrier 260 to the mount 230. The second portion 238 may be fixed (e.g., rigidly coupled to or integrally formed with the first portion 236. For example, a mount implemented as a tube 232 may be manufactured from a single, monolithic tubular piece, by forming a single or a plurality of cut-outs at one end of the tube 232. The first end of the tube 232 that includes the cut-out(s) may be mounted to the underside 216 of the vent panel 210 thereby positioning the transverse passages 237 in close proximity, in some cases immediately adjacent, to the underside of the vent panel 210 and thus in close proximity to the vent passage 211. In some embodiments in which the transverse passages 237 are defined as open channels at one end of the tube 232, that end or portion may be referred to as a castellated end or portion (e.g., as shown in FIG. 3). The valve barrier 260 may be operatively coupled to the mount 230 to form the vent assembly 200, which may then be fixed to the hull of the vessel 100. This assembly sequence may be different in other examples, for example by assembling (e.g., threadedly coupling) the valve barrier 260 to the mount 230 to form the valve 220 before the valve 220 is fixed, via its mount 230, to the vent panel 210.

The vent assembly 200 may include a valve seal 250 near the vent passage 211. The valve seal 250 may be implemented using any suitable combination of structures and/or sealing components which can provide a substantially fluid-tight seal between the vent passage 211 and the one or more transverse passages 237. For example, the valve seal 250 may be implemented using a circumferential ridge 254 configured to cooperate with a circumferential gasket 252. The gasket 252 may be implemented using one or more sealing members, such as but not limited to an annular elastomer. The gasket 252 (e.g., annular elastomer) may be operatively coupled to either the underside 216 of the vent panel 210 or to the upper side 266 of valve barrier 260 to contact and/or be compressed by one or more cooperating ridge(s) 254. The one or more ridges may be blunt or pointed protrusion(s) provided on the underside 216 of the vent panel 210. In some embodiments, the locations of the gasket(s) 252 and cooperating ridge(s) 254 may be reversed such as by coupling the gasket(s) 252 to the vent panel 210 and providing the ridge(s) 254 on the movable valve barrier 260. The valve seal 250 may extend along the full periphery of the vent passage 211 such that when the valve barrier 260 is positioned against the underside 216 of the vent panel 210, fluid is substantially prevented from passing from the vent passage 216 to the one or more transverse passages 237, and vice versa, by the seal assembly 250. The one or more gaskets 252 may be positioned within a groove which retains the corresponding gasket 252 in an operative position for engaging its corresponding ridge 254. The groove may be sized to partially or fully receive the gasket 252, such that only a portion, if any, of the gasket 254 protrudes from the upper side 266 of the body. In some embodiments, multiple co-axially arranged seals may be arranged to contact a corresponding number of ridges. In some such embodiments, one or more seals may be interleaved with one or more ridges on one side of the seal interface (e.g., on the vent plate side or on the valve barrier side), which may enhance the performance of the valve seal. In embodiments in which the thickness of the vent panel 210 varies, the valve barrier 260 may be configured for a cooperating fit with the underside 216 of the vent panel 210. For example, the upper side 266 of the body 262 that faces the vent passage 211 may include a depression 230 configured to receive the central portion 215 of the vent panel 210 at least partially therein to enable the peripheral portion of the upper side 266 of the body 262 to be brought into contact with the underside 216 of the vent panel 210 for sealing the valve 220.

In some embodiments, the valve 220 may additionally or alternatively include one or more seals along the length of the mount 230 to seal the interface or space between the mount 230 and the movable valve barrier 260 such as to reduce or prevent the passage of any fluid across that interface (e.g., across the threaded interface in the embodiment in FIGS. 4 and 5). In the example in FIGS. 4 and 5, one or more circumferential seals (e.g., a first or upper lip seal 242 and second or lower lip seal 244) may be provided to reduce or substantially prevent the passage of fluid (e.g., a gas or liquid) through the space between the tube 232 and the body 262. As such the passage of any fluid across the valve 220, either into or out of the compartment defined, in part, by the structure 202, passes through the transverse passage(s) 237. The one or more seals (e.g., 242 and 244) may also reduce or prevent the ingress of debris or other contaminants into the threaded portion of the valve 220. The one or more seals (e.g., 242 and 244) may be seated in corresponding grooves formed on the interior side of the tube 232. In some embodiments, the one or more seals (e.g., 242 and 244) may function as wiper seals in that they may contact and "clean" the body 262, such as the generally smooth portion of the body 262 above and/or below the threads, when the body 262 is moved axially. In some embodiments, the threads 264 of the body 262 may only extend along a portion of the length of the body 262 that is contained at all times between the seals 242 and 244 and may therefore always remain in engagement with the threaded portion (e.g., threads 234) of the tube 232. In some such embodiments, contact between the seals 242 and 244 and the threads 264 may be avoided, which may reduce the risk of damage to the seals 242 and 244.

An actuator (not shown) such as, for example, a motorized shaft, gear, or a lever, may be mounted to the valve barrier 260 (e.g., body 262) to rotatably or otherwise translate the valve barrier 260 (e.g., body 262) along the length of the valve mount 230 (e.g., tube 220). The actuator may be hydraulic, pneumatic, or electric. The actuator may be operated remotely, e.g., by an electronic controller that transmits actuation commands from a location remote to the tank (e.g., from a control area of the vessel), thereby allowing the valve 220 to be opened and closed without requiring physical or manual access to the interior 207 of the compartment (e.g., tank 110) of the vessel. In some embodiments, the actuator is positioned entirely within the compartment at least partially defined by structure 202 (e.g., the tank 110). In some embodiment, the actuator may be only partially within the compartment (e.g., tank 110), such as, for example, by having a link, rotatable or otherwise, that extends and is connected to the valve barrier 260 (e.g., body 262) at one end and operatively coupled to a power source (e.g., motor hydraulic, pneumatic, or electric) at its opposite end, which may be positioned externally to the compartment (e.g., tank 110).

In use, the actuator may be operated to move, e.g., to lower or raise, the valve barrier 260 to open or close, respectively, the valve 220. When the valve 220 is in a closed state as shown in FIG. 4, the valve barrier 260 is positioned against the underside 216 of the vent panel 210 thereby sealing the vent passage 211. The upper side 266 of the valve barrier 260 is sufficiently large to block the vent passage 211 for sealing the vent passage 211. To open the valve 220, the valve barrier 260 is moved away from the vent panel 210 positioning the upper side 266 in a position spaced apart from the underside 216 of the vent panel 210 to define a fluid path from the interior 207 of the compartment to the exterior 209 as shown in FIG. 5. In the open state, the vent assembly allows fluid (e.g., a gas or liquid) out of the interior 207 of the compartment (or into the interior of the compartment), as may be desired. For example, in the open state, the vent assembly 200 permits a first fluid (e.g., air) to be purged from a tank while the tank is being filled with a second fluid (e.g., ballast and/or fuel) via internal conduit(s) (not shown here) or allows a first fluid (e.g. air) to enter the tank when the second fluid is expelled (via the internal conduit(s)) from the tank. The valve 220 may be closed to seal the vent assembly 200 to prevent the passage of any other fluid (e.g., water) through the vent passage 211 such as when the vessel 100 is at least partially submerged.

Figure 6:
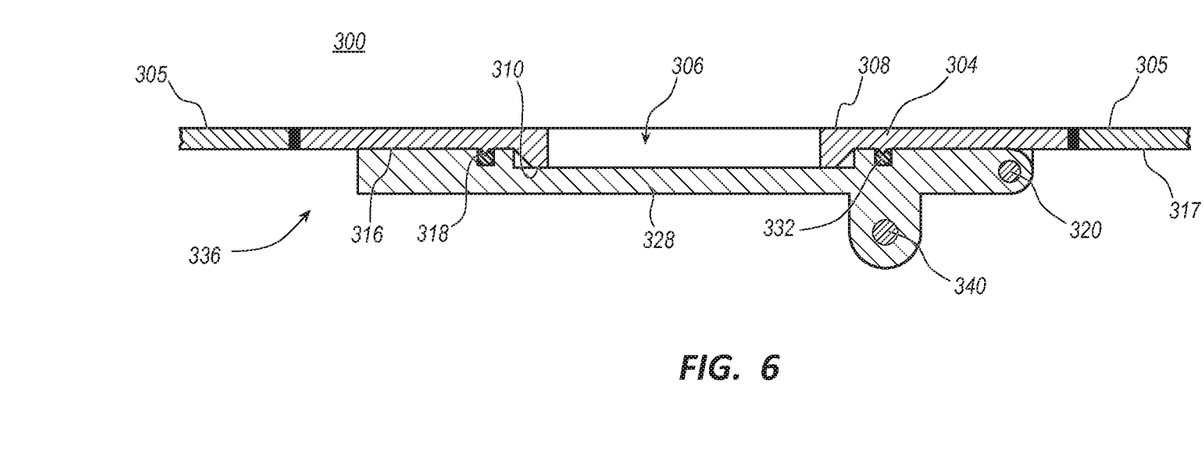
FIG. 6 is a cross-sectional view of another example of a flush-mount valve, shown in a closed state, which may be used for venting and sealing a compartment of the marine vessel in FIG. 2
Figure 7:
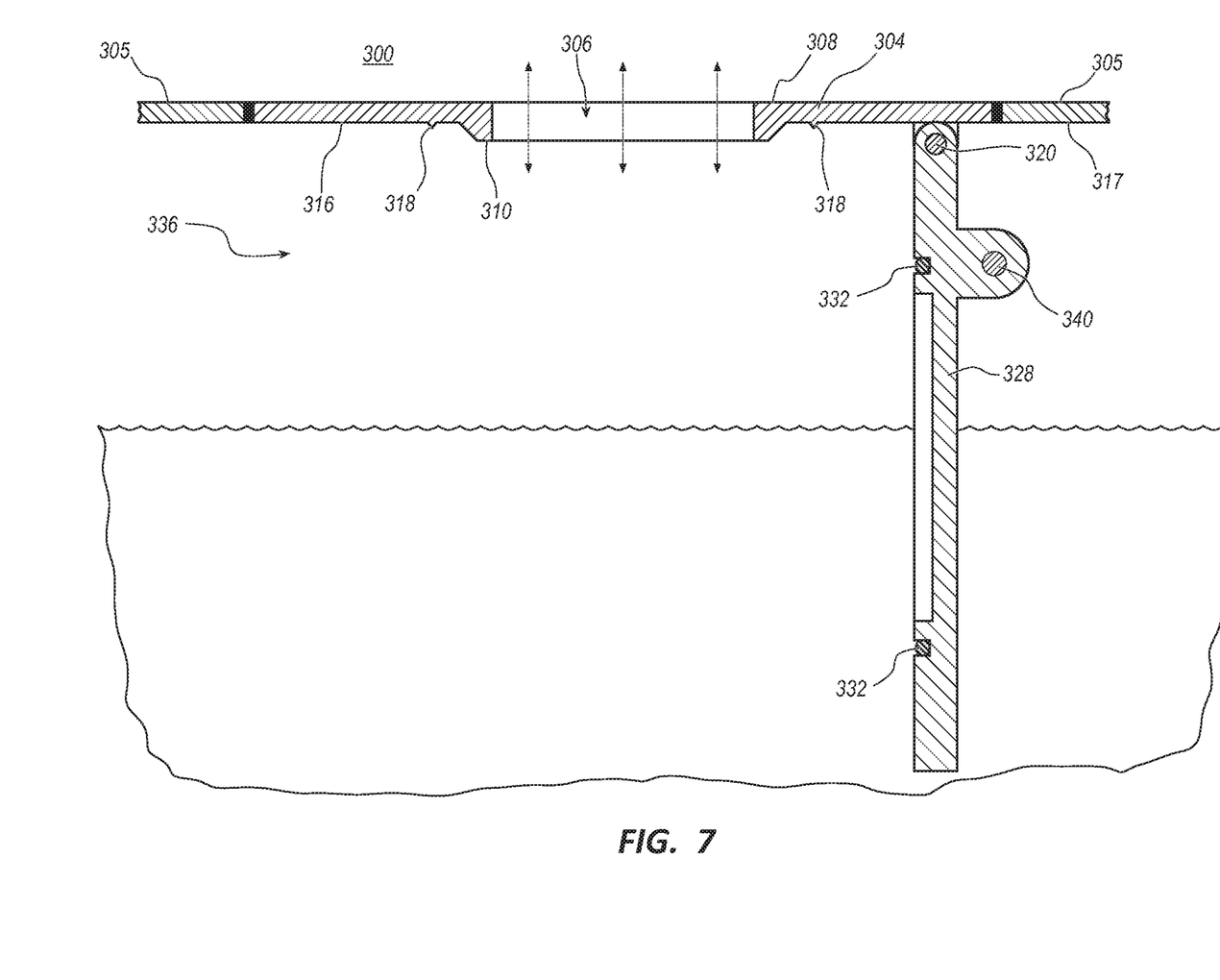
FIG. 7 is a cross-sectional view of the flush-mount valve of FIG. 6 in an open state.

FIGS. 6 and 7 show cross-sectional views of a flush-mount vent assembly 300 according to further embodiments of the present disclosure. The flush-mount vent assembly 300 may be used to implement the vent assembly 116 of the vessel 100 or for sealing a fluid passage in a barrier (e.g., the wall of a container) in any other suitable application. To facilitate an understanding of this example, but without the intention to limit its application to the marine field, the components and operation of the vent assembly 300 will be described below in the context of a valve assembly for sealing the vent in a tank of a marine vessel.

The vent assembly 300 may include a vent plate or panel 304 with a vent passage 306 and a closure mechanism (also referred to as valve) 336. The vent panel 304 is mounted to a surrounding structure 305 (e.g., the wall of a tank). The valve 336 may be mounted to the vent panel 304, such as to the underside of the vent panel 304 so as to remain at or below the outer surface of the structure 305. The vent assembly 300 may be used to seal a vent passage 306 of a tank, such as an air vent of a ballast tank of a marine vessel (e.g., vessel 100). The vent passage 306 may be provided by a through-opening or passage that extends between an exterior surface 308 and an interior surface 306 of a vent panel 304. In some embodiment, the vent panel 304 may be part of the hull 102 or deck 106 of a vessel, shown here as the structure 305. In some embodiments, the vent panel 304 may be formed (e.g., cast, machined, etc.) separately from the surrounding structure 305 (e.g., separately from other panels or structures that form the hull or deck of the vessel) and then rigidly coupled (e.g., welded, fastened, or otherwise) thereto such that the outer surface 308 of the vent panel 304 is substantially coplanar with the outer surface of the surrounding structure 305. The inner surface(s) 310, 316, and 317 define the interior surface of the container that is selectively sealable using the valve 336. In other examples, the vent panel 304 may be integrally formed with the structure 305. In some embodiments, the structure 305 may be part of the outer hull (e.g., the weather deck 106) of the vessel and the outer surface 308 of the vent panel 304 may be part of or mounted to the outer hull so that it is coplanar with the outer hull (e.g., with the outer surface of the weather deck). In some embodiments, the inner surface 316 of the vent panel 304 may also be coplanar with the underside (e.g. inner surface) of the hull (e.g., the underside of the deck 106). In some embodiments, at least a portion of the vent panel 304 may have a different thickness and as such at least a portion of the inner surface 310 may extend below the inner surface of the weather deck 106.

In this example, the valve barrier is implemented by a plate 328, pivotally coupled, e.g., to the vent panel 304. The valve barrier (e.g., plate 328) is pivotally coupled to the vent panel 304 via a barrier mount, shown here as a hinge 320. The vent panel 304 may be positioned at the top end of a tank so that any air within the tank may pass through the passage 306 for a complete purging of the tank while the tank is being filled while the valve barrier (e.g., plate 328) is in an open position. The hinge 320 may be fixed to the underside (e.g., inner surface 316) of the vent panel 304 and/or the surrounding structure 305. The valve barrier (e.g., plate 328) may be pivoted about an axis (also referred to as a hinge axis) that does not cross or intersect the passage 306. The hinge axis may be located outside of the perimeter of the passage 306. The valve barrier (e.g., plate 328 may be pivoted or hinged about one of its ends such that when the valve barrier (e.g., plate 328) is pivoted from the closed position (FIG. 6) to the open position (FIG. 7), the opposite free end of the valve barrier (e.g., plate 328) moves away from the vent panel 304 and thus from the passage 306, and vice versa toward the vent panel 304 and passage 306 when pivoted from the open to the closed position. The hinge axis may extend substantially parallel to the vent panel 304 (e.g., parallel to the underside of the vent panel 304).

The vent assembly 300 may include a sealing assembly like the sealing assembly of any of the examples herein, such as the ones described with reference to FIGS. 1, 3-5, to provide fluid-tight seal between the vent panel 304 and the valve barrier (e.g., plate 328). For example one or a series of ridges 318 (which may also be referred to as a "knife edge") and corresponding gaskets 332 may be coupled to a respective one on the vent panel 304 and plate 328 such that when the valve is in the closed position a ridge 318 contacts and optionally compresses the gasket 332 to create a fluid-tight seal. In some embodiments, the gasket 332 may be formed of a resilient material such as rubber. In some embodiments, a plurality of concentric ridges and gaskets may be used to provide a series of seals to further reduce fluid leaks across the sealing assembly.

In some embodiments, the total area of the passage 306 may be about 25 percent or more of the total area of the vent panel 304. In some embodiments, instead of a single passage, a plurality of smaller passages may be used to provide the vent passage 306. The plurality of passages may be arranged (e.g., arrayed) in the area of the single passage 306 shown in FIGS. 6 and 7. Although the valve barrier (e.g., plate 328) is shown in FIGS. 6 and 7 as being rotatable about a pivot axis that extends perpendicular to the page, in some embodiments, the valve barrier (e.g., plate 328) can be configured to rotate about a pivot axis that extends vertically in FIG. 6 or 7 and thereby rotates away from the vent panel 304 by pivoting into or out of the page in those figures. In some embodiments, the valve barrier (e.g., plate 328) may be connected to an actuator arm at an actuator connection point 340. For example, a telescoping hydraulic or pneumatic arm, a geared arm, a cam-and-follower mechanism, a motorized or manual lever, similar actuation devices, and combinations thereof may apply a force to the plate 328 at the connection point 340 to cause the plate 328 to rotate about the hinge 320 between the open and closed positions of FIGS. 6 and 7. The plate 328 may rotates inward, i.e., into the interior of the tank, so as to not impact the appearance of the exterior of the vessel to an observer similar to the flush-mount valves of other examples herein.

Various examples of the present disclosure have been described in detail above to facilitate an understanding of the invention. It will be recognized by those skilled in the art that many variations to the examples described are possible without departing from the scope and spirit of the invention disclosed herein, and that the scope of the claimed invention is defined by the claims listed below. The terms "including" and "having" as used in the specification and claims shall have the same meaning as the term "comprising." The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

What is claimed is:

1. A marine vessel comprising:
   a tank having a wall that separates an interior of the tank from an exterior of the vessel, the wall defined by a portion of a hull of the vessel; and
   a vent assembly coupled to the wall for fluidly coupling the interior of the tank to the exterior of the vessel, the vent assembly comprising:
      a vent panel having a first surface coplanar with an exterior surface of the vessel and a second surface opposite the first surface and which is positioned in the interior of the tank, the vent panel defining a vent passage;
      a valve barrier positioned below the first surface and movable between a closed position in which the valve barrier blocks the vent passage and an open position in which the valve barrier is spaced apart from the vent passage, wherein the valve barrier is movably coupled to the vent panel via a valve mount that maintains the valve barrier below the first surface irrespective of whether the valve barrier is in the closed position or the open position; and
      a valve seal coupled to an underside of the portion of the hull of the vessel, wherein the valve seal comprises a ridge fixed to one of the underside of the portion of the hull or a first side of the valve barrier facing the underside of the portion of the hull, wherein the ridge is positioned to surround the vent passage, and wherein the ridge is arranged to contact a gasket coupled to the other one of the underside of the portion of the hull and the valve barrier when the valve barrier is in the closed position.

2. The marine vessel of claim 1, wherein the portion of the hull that defines the wall of the tank is a weather deck of the vessel.

3. The marine vessel of claim 2, wherein the valve mount comprises a tube fixed to the underside of the weather deck of the vessel and the valve barrier comprises a body received within the tube and movably coupled to the tube to translate along a length of the tube for moving the valve barrier between the first and second positions.

4. The marine vessel of claim 3, wherein the tube comprises one or more transverse passages proximate the underside of the weather deck.

5. A marine vessel comprising:
   a tank having a wall that separates an interior of the tank from an exterior of the vessel, the wall defined by a portion of a hull of the vessel; and
   a vent assembly coupled to the wall for fluidly coupling the interior of the tank to the exterior of the vessel, the vent assembly comprising:
      a vent panel having a first surface coplanar with an exterior surface of the vessel and a second surface opposite the first surface and which is positioned in the interior of the tank, the vent panel defining a vent passage;
      a valve barrier positioned below the first surface and movable between a closed position in which the valve barrier blocks the vent passage and an open position in which the valve barrier is spaced apart from the vent passage, wherein the valve barrier is movably coupled to the vent panel via a valve mount that maintains the valve barrier below the first surface irrespective of whether the valve barrier is in the closed position or the open position;
   wherein the valve mount comprises a tube fixed to an underside of the portion of the hull of the vessel, wherein the valve barrier comprises a body received within the tube and movably coupled to the tube to translate along a length of the tube for moving the valve barrier between the first and second positions;

wherein the tube is a cylindrical tube, and wherein the body is a cylindrical body rotatably coupled to the tube such that rotation of the cylindrical body about a longitudinal axis of the tube causes the cylindrical body to move along the longitudinal axis of the tube to move the valve barrier between the first and second positions.

6. The marine vessel of claim 5, wherein the cylindrical body is threadedly coupled to the tube.

7. The marine vessel of claim 5, wherein the vent assembly is configured to allow substantially all air within the interior of the tank to be purged out of the tank when filling the tank with a liquid.

8. A valve assembly comprising:
a panel having a first side and a second side opposite the first side, the panel defining a vent passage that provides the first side of the panel in fluid communication with the second side of the panel;
a valve barrier movably coupled, via a mount, to the second side of the panel such that the valve barrier is movable between a first position in which the valve barrier substantially blocks the vent passage and a second position in which the valve barrier is spaced apart from the vent passage, the valve barrier remaining below the first side of the panel irrespective of whether the valve barrier is in the first position or the second position; and
a valve seal coupled to the second side of the panel, wherein the valve seal comprises a ridge fixed to the second side of the panel or a first side of the valve barrier facing the panel, wherein the ridge is positioned to surround the vent passage, and wherein the ridge is arranged to contact a gasket coupled to the other one of the panel and the valve barrier when the valve barrier is in the first position;
wherein the first side of the valve barrier includes a depression configured to receive a portion of the panel therein when the valve barrier is in the first position;
wherein the mount comprises a tube fixed to the second side of the panel, wherein the tube defines a longitudinal passage along a length of the tube and one or more transverse passages through a thickness of the tube that fluidly connect an outside of the tube to the longitudinal passage, and wherein the valve barrier is configured to translate along the length of the tube to move between the first position and the second position;
wherein the tube is a cylindrical tube, and wherein the valve barrier comprises a cylindrical body received in the tube and configured to move along the length of the tube; and
wherein the cylindrical body is threadedly coupled to the tube.

9. The valve assembly of claim 8, further comprising one or more seals at one or more locations along the length of the tube that seal between the cylindrical body and the tube where the cylindrical body is threadedly coupled to the tube.

10. The valve assembly of claim 8, wherein the valve barrier is rotatably coupled to the tube.

11. The valve assembly of claim 8, wherein the one or more transverse passages are adjacent to the second side of the panel.

12. The valve assembly of claim 8, wherein the panel has a substantially constant thickness.

13. The valve assembly of claim 8, wherein a thickness of the panel near the vent passage is different than a thickness of the panel at a location away from the vent passage.

14. The valve assembly of claim 13, wherein the thickness of the panel near the vent passage is greater than the thickness of the panel at the location away from the vent passage.

15. The valve assembly of claim 8, wherein the mount is fixed to the second side of the panel.

* * * * *